(12) United States Patent
Tengler et al.

(10) Patent No.: US 6,778,900 B2
(45) Date of Patent: Aug. 17, 2004

(54) VEHICLE MILEAGE LOGGING SYSTEM

(75) Inventors: Steven C. Tengler, Grosse Point Park, MI (US); John P. Weiss, Dearborn, MI (US); William Lindholm, Royal Oak, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 184 days.

(21) Appl. No.: 10/112,459

(22) Filed: Mar. 29, 2002

(65) Prior Publication Data

US 2003/0187572 A1 Oct. 2, 2003

(51) Int. Cl.⁷ .............................................. G01C 21/00
(52) U.S. Cl. ....................................... 701/201; 701/200
(58) Field of Search ............................... 701/200, 201, 701/213, 35, 36; 73/178 R

(56) References Cited

U.S. PATENT DOCUMENTS

| 5,021,961 A | * | 6/1991 | Ross et al. .................. 701/200 |
| 5,046,007 A | | 9/1991 | McCrery et al. ....... 364/424.04 |
| 5,267,159 A | | 11/1993 | O'Neall .................. 364/424.04 |
| 5,557,524 A | | 9/1996 | Maki ...................... 364/424.04 |
| 5,787,373 A | | 7/1998 | Migues et al. ................ 701/33 |
| 5,893,893 A | | 4/1999 | Holt et al. .................... 701/35 |
| 6,064,929 A | | 5/2000 | Migues et al. ................ 701/35 |
| 6,088,636 A | | 7/2000 | Chigumira et al. ........... 701/26 |
| 6,115,655 A | | 9/2000 | Keith et al. ................... 701/35 |

FOREIGN PATENT DOCUMENTS

DE 196 27 876 A1 * 1/1998 ........... B60K/35/00

* cited by examiner

*Primary Examiner*—Yonel Beaulieu
(74) *Attorney, Agent, or Firm*—Brinks Hofer Gilson & Lione

(57) ABSTRACT

A motor vehicle mileage logging system is disclosed that will calculate a cumulative mileage log by summing several different types of individual trip logs. The system is installed on a vehicle having a navigation assist system. A first type of individual trip log includes mileage information determined as the vehicle is driven from an origination point to a destination point with the assistance of the navigation system. A second type of individual trip log includes mileage information that is estimated by the navigation assist system using a manually entered origination point and a manually entered destination point. A third type of individual trip log includes a manually entered estimated mileage log.

23 Claims, 3 Drawing Sheets

VEHICLE MILEAGE LOGGING SYSTEM

FIELD OF INVENTION

The invention relates to a vehicle mileage logging system, and particularly to a vehicle mileage logging system that can calculate a cumulative mileage log with the assistance of a navigation assist system.

BACKGROUND OF THE INVENTION

The use of motor vehicle mileage logging systems is becoming more prevalent. Typically, these systems calculate cumulative mileage logs from a group of selected individual trip logs where the individual trip logs can only be determined as the vehicle is being driven from an origination point to a desired destination point.

One known system is disclosed in U.S. Pat. No. 6,115,655 (Keith et al.) Keith et al. teach a method of measuring a distance traveled by a vehicle where there is equipment on-board the vehicle to determine information for an individual trip and a fixed base that is not located on board the vehicle. The fixed base includes a base computer that communicates with the on-board equipment when the vehicle is physically stationed and connected to the fixed base. The base computer will calculate a cumulative mileage log once the individual trip information is communicated to the base computer.

A disadvantage of this system is that the cumulative mileage log is not calculated on-board the vehicle. Further, the system will only allow the cumulative mileage log to include individual trip entries in which the vehicle actually traveled the route and the system was prompted to keep a log of the information.

SUMMARY OF THE INVENTION

The present invention resolves the problems outlined above by providing a method for creating a cumulative mileage log on-board a vehicle having a navigation assist system. Navigation assist systems are used on-board vehicles to provide the location of the vehicle and often have the ability to map out a route to a desired destination point. Improvements have been made to these systems to keep track of the mileage traveled for individual trips using the navigation assist system.

The system disclosed here goes one step further. This system is capable of calculating a cumulative mileage log of selected individual trips on-board a vehicle. However, this system will include in the cumulative mileage log, individual trips in which the navigation assist system was not prompted to keep track of the mileage traveled. Further, the system allows multiple cumulative mileage logs to be calculated based on several different types of individual trip logs.

The first type of individual trip log includes information determined as the vehicle is actually being driven with the assistance of the navigation system. The second type of individual trip log includes a manual entry of an origination point and a destination point where the navigation assist system will compute an estimated mileage between the two entered points. A third type of individual trip log includes a manually entered estimated trip mileage.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

The following description of the preferred embodiment of the invention is not intended to limit the invention to this preferred embodiment, but rather to enable a person skilled in the art of vehicle mileage logging systems to make and use this invention.

Figure 1:
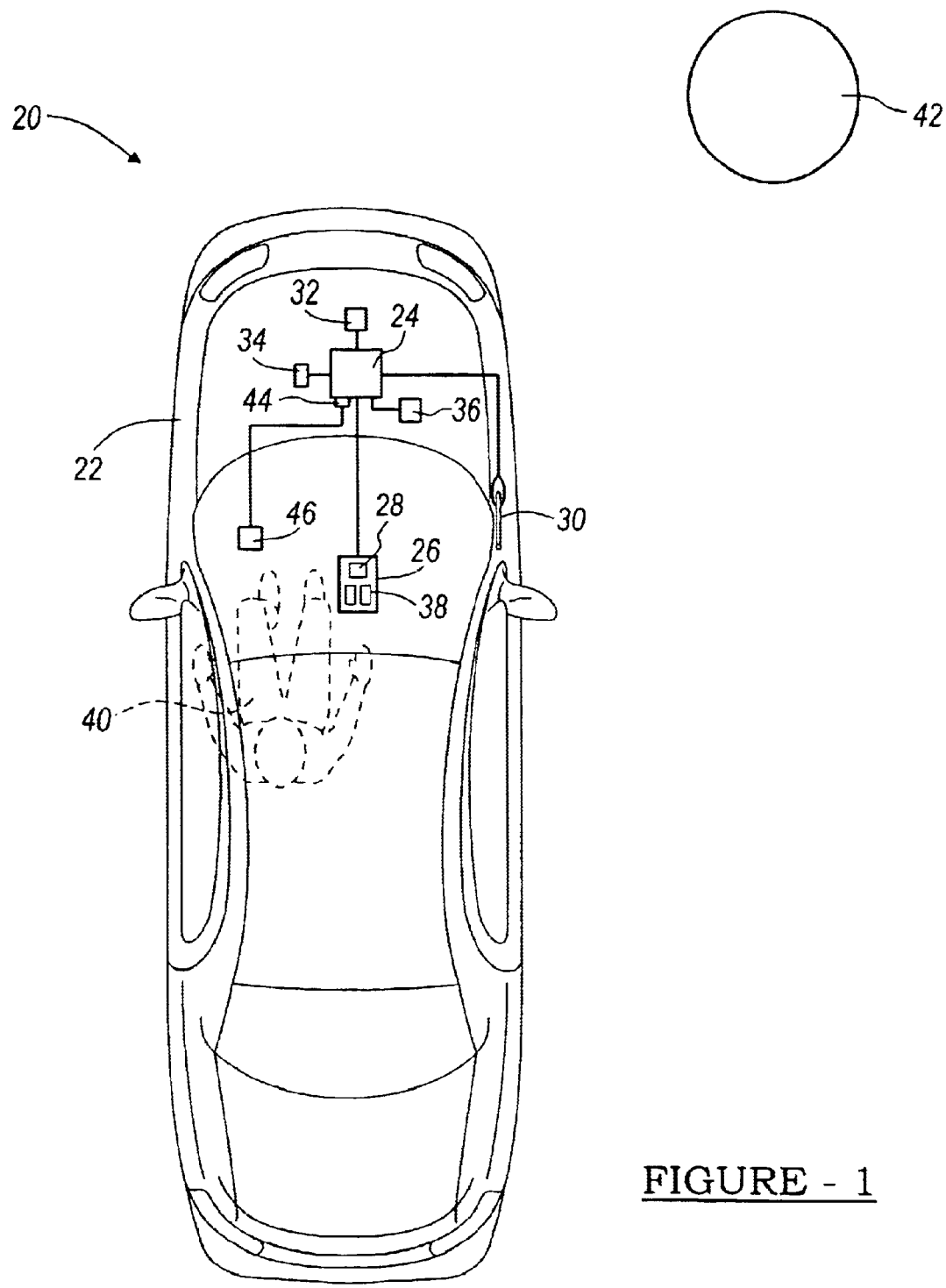
FIG. 1 is a perspective view of a vehicle having the mileage logging system of the present invention on-board.

As shown in FIG. 1, a vehicle 22 equipped with the mileage logging system is shown generally at 20. The vehicle 22 includes a controller 24, a user input mechanism 26, a display 28, an antenna 30, a vehicle speed sensor 32 and a directional orientation measuring device 34. The controller 24 receives input from the user input mechanism 26, antenna 30, vehicle speed sensor 32 and directional orientation measuring device 34. Further, the controller 24 is capable of accessing a map database 36. The map database 36 could be loaded on a compact disc ("CD"), a digital video disc ("DVD"), or stored in the memory of the controller 24.

The user input mechanism 26 is preferably integrated into the instrument panel of the vehicle 22. Alternatively, the user input mechanism 26 could be a separate component capable of being mounted to the interior of a vehicle 22 or it could be an auxiliary computer system capable of communicating with the controller 24. The user input mechanism 26 includes at least one hard key 38 for receiving data from a user 40. However, it should be noted that other forms of user input mechanisms could be utilized with this system. For instance, soft keys could also be utilized. Soft key data entry may include a touch screen format. Soft key data entry may also include commands appearing on a screen or display and requiring a user to touch a particular hard key to perform the desired associated command. Yet another type of user input mechanism could be a voice activation system.

Similarly, the display 28 is preferably built into the interior of the vehicle 22, for instance in the instrument panel. Alternatively, the display 28 may be part of a separate component capable of being mounted in the interior of a vehicle 22 or capable of communicating with the controller 24. The display 28 receives and displays information from the controller 24 and the user input mechanism hard keys 38.

The antenna 30 is positioned on the vehicle 22 for receiving signals transmitted by satellites 42 that are part of a global positioning system. There could also be a receiver connected to the antenna that creates an output to the controller. Further, the antenna 30 is in communication with the controller 24. If there is a receiver associated with the antenna, the antenna would communicate with the controller via the receiver. The antenna 30 could be the same antenna used in the vehicle's audio system or there could be a separate antenna dedicated to the vehicle mileage logging system. It is known to mount an antenna that receives signals from satellites on the vehicle's instrument panel at the base of the windshield. However, the antenna could be mounted at any position on the vehicle.

A vehicle speed sensor 32 detects the speed of the vehicle 22. The speed sensor 32 communicates the speed information to the controller 24. The speed sensor 32 is preferably mounted on the vehicle 22. The speed sensor 32 may be the wheel speed sensor provided as part of a vehicle's antilock braking system (ABS). Alternatively, the speed sensor may detect the vehicle's speed by monitoring the rotating teeth of the rear axle. Also, the vehicle's speed information could be obtained from the Electronic Engine Controller ("EEC"), which broadcasts vehicle information to other modules.

A directional orientation measuring device 34 is also mounted on the vehicle 22 for detecting vector position information regarding the vehicle 22. The directional orientation measuring device 34 communicates this information to the controller 24. The directional orientation measuring device could be a gyro or a digital compass.

The controller 24 calculates a cumulative mileage log based on selected individual mileage logs. The individual mileage logs are manually selected from numerous stored individual mileage logs. An individual mileage log represents the mileage traveled for one particular trip. An individual mileage log can be calculated using any of three different techniques.

The first individual mileage log technique involves the assistance of the on-board navigation system while the vehicle is in transit. This type of log is referred to as an actual vehicle travel mileage log. The controller 24 processes input from the antenna 30, vehicle speed sensor 32, directional orientation measuring device 34 and information accessed from the map database 36 to determine the actual vehicle travel mileage.

The controller preferably receives data from three different satellites to determine the vehicle's location within a 30 foot radius. Using this information in combination with the map database, the controller will determine a likely road along which the vehicle is traveling. The controller will utilize information from the vehicle speed sensor and the directional orientation device to match the motion of the vehicle to the map database and determine a more specific vehicle location. A very accurate vehicle location can be determined based on definitive movement of the vehicle, for example when the vehicle makes a 90° turn onto another street.

There are numerous procedures to prompt the system to create an actual vehicle travel mileage log, including but not limited to the two ways outlined here. One procedure involves the system automatically keeping track of the vehicle's travel from an origination point and a user inputting a destination point. Another procedure includes a user prompting the system to start recording vehicle travel and the user prompting the system regarding the destination point for the particular trip.

The second individual mileage log technique involves the on-board navigation system estimating a mileage. This type of log is referred to as an estimated mileage log. The estimated mileage log is determined by the controller 24 upon manual entry of an origination point and a destination point. The origination point and destination point are entered through the user input mechanism 26. The controller 24 utilizes information from the map database 36 to calculate an estimated mileage between the origination point and destination point.

The third individual mileage log technique involves an individual mileage log determined by a mileage estimate between an origination point and a destination point that is manually entered through the user input mechanism 26. This type of log is referred to as a manually entered estimated mileage log.

The controller 24 is capable of calculating a second cumulative mileage log including a second set of selected individual mileage logs. Further, the system is capable of keeping numerous cumulative mileage logs. Each cumulative mileage log is calculated based on a selected set of individual mileage logs.

The controller 24 may also have an output port 44 for connection to an auxiliary computer system 46. The auxiliary computer system 46 could be any type of computer system, including but not limited to, a personal digital assistant or a laptop computer. The auxiliary computer system may or may not be the same system that could be used as an auxiliary user input mechanism.

Figure 2:
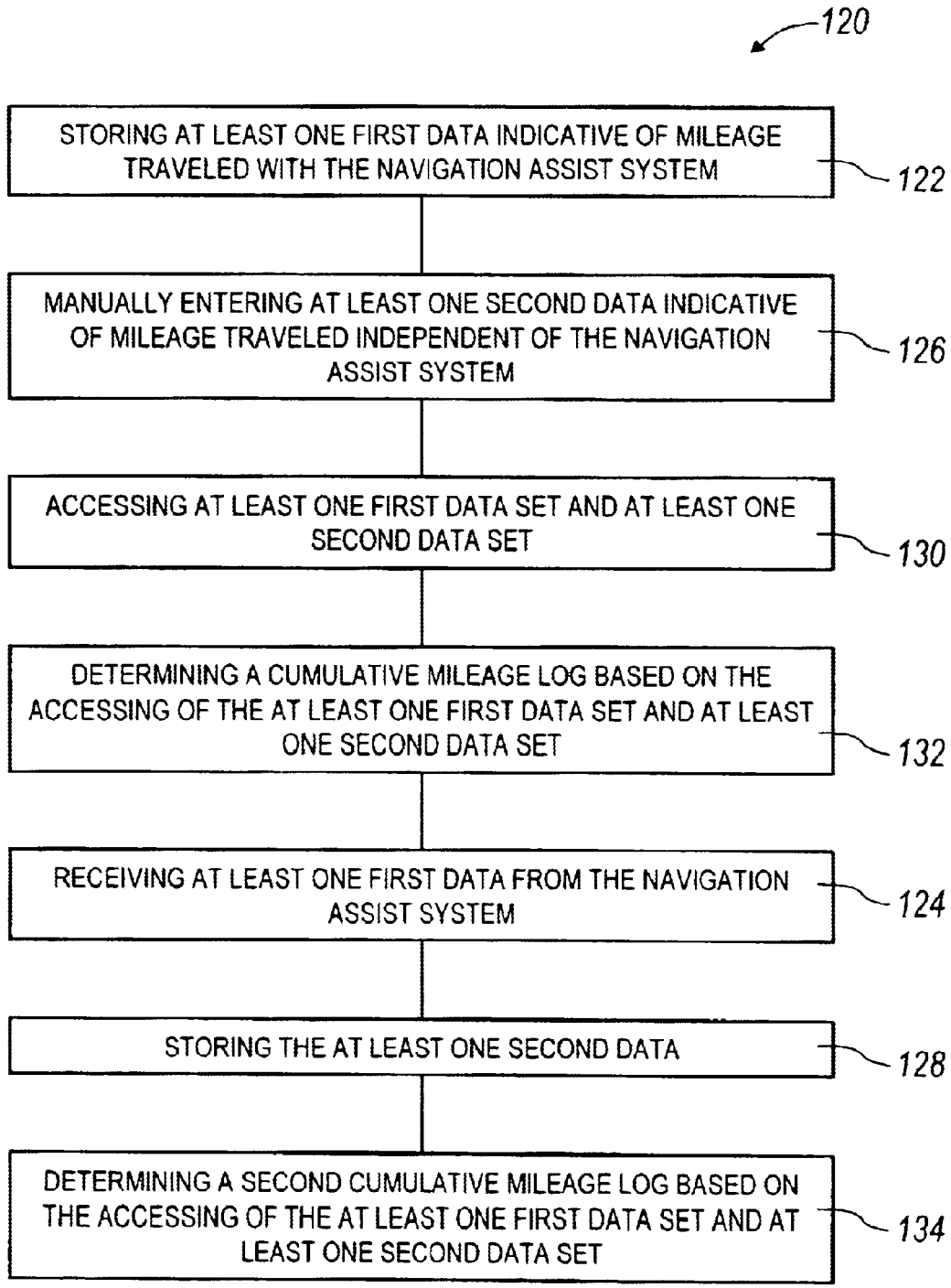
FIG. 2 is a flowchart illustrating the method of the present invention.

Referring to FIG. 2, the method for creating a cumulative mileage log in a vehicle having a navigation assist system is also disclosed, shown generally at 120. A first data set is stored indicative of mileage traveled with the navigation assist system, at 122. The first data set is received from the navigation assist system, at 124.

A second data set is manually entered indicative of mileage traveled independent of the navigation assist system, at 126. Manual entry of the second data set can be done using several different techniques. The first technique includes entering an origination point and a destination point. In this technique the navigation assist system will calculate an estimated mileage between the origination point and destination point. The second technique includes manually entering an estimated mileage between an origination point and a destination point. The second data set is stored so that it can be accessed, at 128.

The first and second data sets are accessed, at 130. There could be a plurality of first data and second data sets. Accessing the first and second data sets includes manually selecting first and second data sets to be included in the cumulative mileage log.

A cumulative mileage log is determined based on the accessing of the first and second data sets, at 132. The cumulative mileage log is calculated by summing the accessed first and second data sets. Further, a second cumulative mileage log can be determined based on accessing the first and second data sets, at 134.

Figure 3:
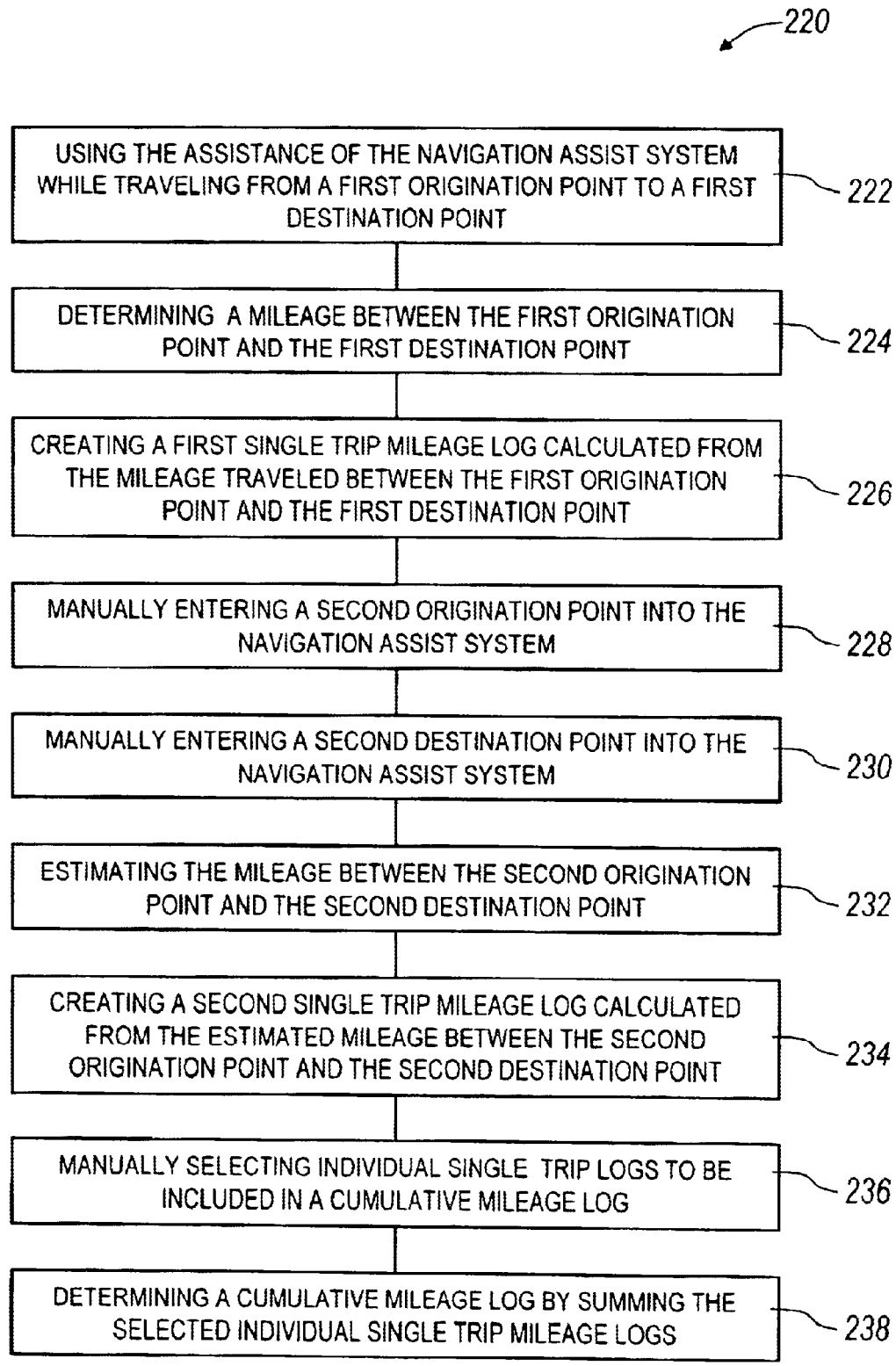
FIG. 3 is a flowchart illustrating an alternative embodiment of the method of the present invention.

Referring to FIG. 3, an alternative method for creating a cumulative mileage log in a vehicle having a navigation assist system is also disclosed, shown generally at 220. The navigation assist system is used while the vehicle travels from a first origination point to a first destination point, at 222. A mileage between the first origination point and the first destination point is determined, at 224. A first single trip mileage log is created based on the calculated mileage traveled between the first origination point and the first destination point, at 226. A plurality of single trip mileage logs can be created based on the calculated mileage traveled between a plurality of origination points and a plurality of destination points.

A second origination point and a second destination point are manually entered into the navigation assist system, at 228 and 230. The mileage between the second origination point and the second destination point is estimated, at 232. A second single trip mileage log is created based on the calculated mileage estimate between the second origination point and the second destination point, at 234. A plurality of single trip mileage logs can be created based on the estimated mileage between a plurality of manually entered origination points and manually entered destination points.

A third single trip mileage log can be determined by entering through the user input an estimated mileage driven from a third origination point to a third destination point.

Individual single trip logs are manually selected to be included in a cumulative mileage log, at 236. The cumulative mileage log is determined by summing the selected individual single trip mileage logs, at 238. A second cumulative mileage log can be determined by summing a second set of selected single trip mileage logs. A third cumulative mileage log is determined by summing a third set of selected single trip mileage logs. In fact, the system is capable of calculating numerous cumulative mileage logs. For example, cumulative mileage logs can be calculated for different users or for different categories of travel. Different categories of travel may include, but are not limited to, business, personal or charity.

There are several other features that could be incorporated into the system. One option is an "ADD" feature. This feature allows the user to re-add an individual trip to a cumulative log that had been deleted from the cumulative mileage log. Another option is to include a "CLEAR ALL" feature that would empty all of the stored individual and cumulative mileage logs. A "LOG" feature allows the last individual trip to be included in a cumulative mileage log.

The mileage log information can be transferred to a separate computer system, including but not limited to, a personal digital assistant or a laptop computer.

While the above description constitutes the preferred embodiment of the present invention, it will be appreciated that the invention is susceptible to modification, variation and change without departing from the proper scope and fair meaning of the accompanying claims.

We claim:

1. A method for creating a cumulative mileage log in a vehicle having a navigation assist system, the method comprising:
    determining a mileage actually traveled using the navigation assist system;
    storing at least one first data set including the mileage actually traveled with the navigation assist system;
    manually entering at least one second data set indicative of mileage traveled independent of the navigation assist system;
    accessing at least one first data set and at least one second data set; and
    determining a cumulative mileage log based on the accessed at least one first data set and at least one second data set.

2. The method of claim 1 further comprising receiving the at least one first data set from the navigation assist system.

3. The method of claim 1 further comprising storing the at least one second data set.

4. The method of claim 1 wherein manually entering the at least one second data set includes entering an origination point and a destination point.

5. The method of claim 1 wherein manually entering the at least one second data set includes entering an estimated mileage.

6. The method of claim 1 wherein there are a plurality of first data sets.

7. The method of claim 1 wherein there are a plurality of second data sets.

8. The method of claim 1 wherein accessing the at least one first data set and the at least one second data set includes manually selecting at least one first data set and at least one second data set to be included in the cumulative mileage log.

9. The method of claim 1 wherein determining a cumulative mileage log includes summing the accessed at least one first data set and at least one second data set.

10. The method of claim 1 further comprising determining a second cumulative mileage log based on the accessing of the at least one first data set and at least one second data set.

11. A method for creating a cumulative mileage log in a vehicle having a navigation assist system, the method comprising:
    using the assistance of the navigation assist system while traveling from a first origination point to a first destination point;
    determining a mileage between the first origination point and the first destination point;
    creating a first single trip mileage log calculated from the mileage traveled between the first origination point and the first destination point;
    manually entering a second origination point into the navigation assist system;
    manually entering a second destination point into the navigation assist system;
    estimating the mileage between the second origination point and the second destination point;
    creating a second single trip mileage log calculated from the estimated mileage between the second origination point and the second destination point;
    manually selecting individual single trip logs to be included in a cumulative mileage log; and
    determining a cumulative mileage log by summing the selected individual single trip mileage logs.

12. The method of claim 11 further comprising:
    creating a plurality of single trip mileage logs calculated from the mileage traveled between a plurality of origination points and a plurality of destination points; and
    creating a plurality of single trip mileage logs calculated from estimated mileage between a plurality of manually entered origination points and manually entered destination points.

13. The method of claim 12 further comprising determining a second cumulative mileage log by summing a second set of selected single trip mileage logs.

14. The method of claim 11 further comprising determining a third single trip mileage log by entering through the user input an estimated mileage driven from a third origination point to a third destination point.

15. The method of claim 14 further comprising determining a third cumulative mileage log by summing a third set of selected single trip mileage logs.

16. The method of claim 11 further comprising transferring the mileage log information to a separate computer system.

17. A motor vehicle mileage logging system comprising:
    a controller positioned within the vehicle capable of accessing a map database;
    a user input mechanism in communication with the controller;
    a display for receiving and displaying information from the controller;
    an antenna positioned on the vehicle for receiving signals transmitted by satellites in a global positioning system and in communication with the controller;
    a vehicle speed sensor in communication with the controller;
    a directional orientation measuring device mounted on the vehicle and in communication with the controller; and
    wherein the controller calculates a cumulative mileage log including selected individual mileage logs, wherein the individual mileage logs include actual vehicle travel mileage logs determined by the controller using input from the antenna, vehicle speed sensor, and directional orientation measuring device and estimated mileage logs determined by the controller using a desired origination point and a desired destination point entered through the user input mechanism.

18. The logging system according to claim 17 wherein the cumulative mileage log further includes an individual mileage log determined by a mileage estimate between an origination point and a destination point entered through the user input mechanism.

19. The logging system according to claim 17 wherein the controller calculates a second cumulative mileage log including a second set of selected individual mileage logs.

20. The logging system according to claim 17 wherein the directional orientation measuring device is a gyro.

21. The logging system according to claim 17 wherein the directional orientation measuring device is a digital compass.

22. The logging system according to claim 17 wherein the controller further includes an output port for connection to an auxiliary computer system.

23. The logging system according to claim 22 wherein the auxiliary computer system is a personal digital assistant.

* * * * *